United States Patent [19]

Netravali et al.

[11] 4,141,034
[45] Feb. 20, 1979

[54] DIGITAL ENCODING OF COLOR VIDEO SIGNALS

[75] Inventors: Arun N. Netravali, Matawan; Charles B. Rubinstein, Colts Neck, both of N.J.

[73] Assignee: Bell Telephone Laboratories, Incorporated, Murray Hill, N.J.

[21] Appl. No.: 826,025

[22] Filed: Aug. 19, 1977

[51] Int. Cl.² .................. H04N 9/32; H04N 7/12; H04B 7/00
[52] U.S. Cl. .................. 358/13; 358/135; 325/38 B
[58] Field of Search .................. 358/13, 135, 140; 325/38 B

[56] References Cited

U.S. PATENT DOCUMENTS

| | | | |
|---|---|---|---|
| 3,773,971 | 11/1973 | Sainte-Bouve | 358/13 |
| 3,803,348 | 4/1974 | Limb et al. | 358/13 |
| 3,860,953 | 1/1975 | Cutler et al. | 358/13 |
| 3,984,626 | 10/1976 | Mounts et al. | 358/135 |
| 4,023,199 | 5/1977 | Netravali et al. | 358/13 |

Primary Examiner—Robert L. Griffin
Assistant Examiner—Aristotelis M. Psitos
Attorney, Agent, or Firm—Barry H. Freedman

[57] ABSTRACT

For a given transmission bit rate, the efficiency of encoding the color components of a color video signal is increased by utilizing information obtained from the luminance component to optimize color component encoding. Specifically, several predictions of the present luminance sample are formed using various individual values or combinations of previous luminance information. Each prediction is evaluated, and the best prediction technique is used to predict the present color sample, based upon previous color component information. Decoding in a remote receiver is accomplished similarly, by utilizing the luminance signal as a source for color component prediction information.

13 Claims, 6 Drawing Figures

SELECTION LOGIC

DIGITAL ENCODING OF COLOR VIDEO SIGNALS

BACKGROUND OF THE INVENTION

1. Field of the Invention

This invention generally relates to the digital encoding of the luminance and color components of a color video signal and, in particular, to an adaptive technique which bases color component encoding on characteristics of the luminance component.

2. Description of the Prior Art

Even though color video signals are often represented as luminance and color components, which are encoded separately, it is well known that the interrelationship between these components can be used to advantage in increasing overall encoding efficiency. For example, in U.S. Pat. No. 3,803,348 issued to J. O. Limb and C. B Rubinstein on Apr. 9, 1974, it was recognized that significant changes in chrominance information generally accompany significant changes in the luminance signal or, stated differently, that luminance edges usually have accompanying color transitions. Accordingly, Limb et al arranged for transmission of average chrominance values until a significant luminance change occurred, whereupon an updated chrominance value was transmitted. While this technique was successful, it was nevertheless realized in U.S. Pat. No. 3,860,953 issued to C. C. Cutler, J. O. Limb and C. B. Rubinstein on Jan. 14, 1975, that important chrominance changes sometimes occur alone. To account for this, the luminance signal was intentionally distorted to signal to the remote receiver that an updated chrominance value was arriving. In another arrangement, it was shown by A. N. Netravali and C. B. Rubinstein in U.S. Pat. No. 4,023,199, issued May 10, 1977, that busy picture areas, as indicated by large luminance signal activity, could tolerate chrominance encoding errors better than flat picture regions. Accordingly, the quantizer characteristics of the chrominance encoders were adapted to the luminance signal activity in order to conserve bandwidth.

While the above systems are successful in utilizing the interrelationship of the luminance and color components of a color video signal so as to reduce redundancy in the overall encoded version thereof, it still appears that the correlation between certain characteristics of these components has not been fully exploited. Accordingly, the broad object of the present invention is to increase the efficiency and accuracy of color video signal encoding by employing luminance component characteristics to predict those of the color component. Other objects are to permit increased encoding efficiency with apparatus which is not unduly complex or costly. A still further object is the provision of apparatus that may easily be added to presently available equipment to attain the desired result.

As used herein, increased encoding efficiency can mean either increased encoding accuracy or picture quality with a constant transmission bit rate, or a reduction in the bit rate required to represent a video signal with a given picture quality.

SUMMARY OF THE INVENTION

The foregoing and additional objects are achieved by the present invention by taking advantage of the fact that luminance and color edges in many pictures are coincident, so that spatial information derived from the luminance component can be used to increase the accuracy of a predicted color component value. Specifically, several predictions of the luminance value of a particular picture element (pel) then being processed are made, based upon the luminance values of one or more neighboring picture elements. Each prediction can be thought of as a weighted sum of previous luminance values, with different weighting patterns being used for each of the several predictions.

Each luminance prediction is evaluated to determine which weighting pattern (or combination of neighboring values) produces the best prediction, i.e., the one with the smallest prediction error. The color value of the same picture element is then predicted by combining the color values of the neighboring pels in accordance with the *same* weighting pattern.

At a remote receiver, decoding is accomplished in a similar fashion, by using the luminance signal as a source of information which enables more accurate color prediction. It is to be noted that this technique does not imply that color values can be predicted directly from luminance values; rather, it has been found that information obtained from the luminance component can be used in predicting the color component with less error.

As used in the preceding summary, the generic term "color component" is meant to include the portion of a composite video signal other than a luminance or brightness, that conveys "color" information. Thus, "color components" may be "chromaticity" or "chrominance," or any other combination of information that is derived from the composite signal to represent its "color" characteristics. However, in the succeeding description, a luminance component Y and two chrominance components $C_1$ and $C_2$ will be used to describe a composite video signal, since "chrominance" is most often used by those skilled in the art to represent color information.

The present invention is advantageous in that full use is made of the information contained in the luminance component to adaptively change the prediction strategy of the chrominance encoder. Using modern digital techniques, the processing required by the present invention is easily implemented, and the added circuitry will easily interface with existing encoder technology. A still further benefit may be derived from the present invention by applying the quantized output of the chrominance encoders to variable length encoders which take advantage of the fact that different quantized output levels do not occur with the same statistical frequency, so that short codes can be assigned to more frequently occurring quantized values. Thus, by further increasing the probability of occurrence of frequently occurring quantized values (in this case, the lower values) a significant decrease in bit rate may be obtained without sacrifice of picture quality. If desired, the input/output characteristics of the variable length coders can be varied as a function of the difference between the best luminance prediction and the true luminance value.

BRIEF DESCRIPTION OF THE DRAWING

The present invention will be more fully appreciated by consideration of the following detailed description, when read in light of the accompanying drawing in which.

DETAILED DESCRIPTION

Figure 1:
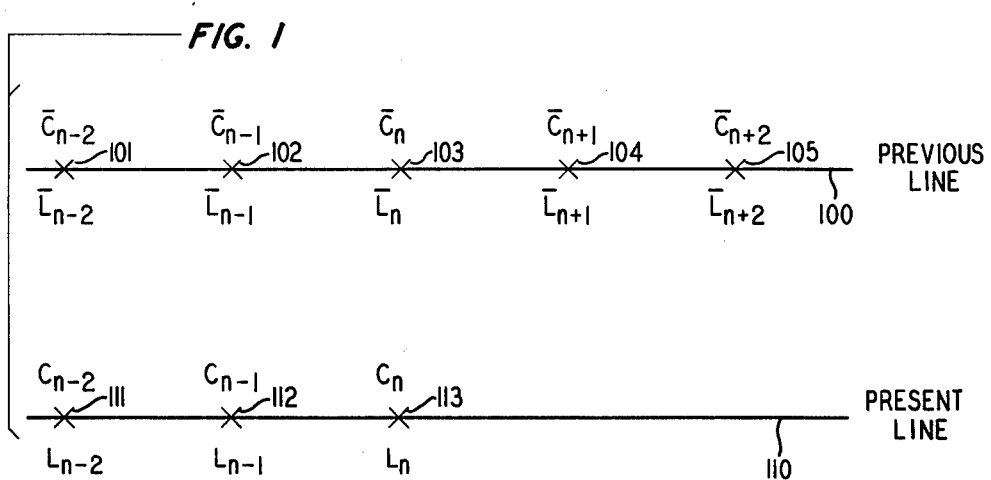
FIG. 1 illustrates the location of picture elements (pels) in the video signal being encoded, and the symbology for the luminance and chrominance values of each pel.

In FIG. 1, the chrominance and luminance components of a color video signal are sampled at a plurality of points or picture elements (pels) 101-105 and 111-113 which lie along a plurality of generally parallel scan lines, such as line 110 which contains the element 113 presently being processed, and line 100 which is the previous line. The luminance and chrominance values of the presently processed pel are represented as $L_n$ and $C_n$, respectively, it being understood that each pel has, in reality, two chrominance values $C_1$ and $C_2$ which may be independently processed in a similar fashion; only one value is shown for simplicity. Previous pels 112 and 111 on the present scan line (assuming scanning from left to right and from top to bottom in FIG. 1) are represented by luminance and chrominance values $L_{n-1}, C_{n-1}$ and $L_{n-2}, C_{n-2}$, respectively; other pels on line 110 bear similar notation.

In the previous line 100, the notation for luminance and chrominance values is $\bar{L}$ and $\bar{C}$, respectively. The component values of element 103 immediately above the present element 113 are thus $\bar{L}_n, \bar{C}_n$, and pels 102 and 101 previous to pel 103 are represented $\bar{C}_{n-1}, \bar{L}_{n-1}$ and $\bar{C}_{n-2}, \bar{L}_{n-2}$, respectively. Pels 104 and 105 subsequent to pel 103 have luminance and chrominance values $\bar{L}_{n+1}, \bar{C}_{n+1}$ and $\bar{L}_{n+2}, \bar{C}_{n+2}$, respectively.

In certain encoding systems, it is to be noted that the luminance component is sampled at a rate several times higher than the sampling rate used for the chrominance component, so that luminance samples not shown in FIG. 1 may be interspersed between the samples that are shown. However, it has been found that these "extra" luminance samples should not be used in the chrominance encoding strategy, since the luminance samples coincident with chrominance samples generally prove to be more accurate.

Figure 2:
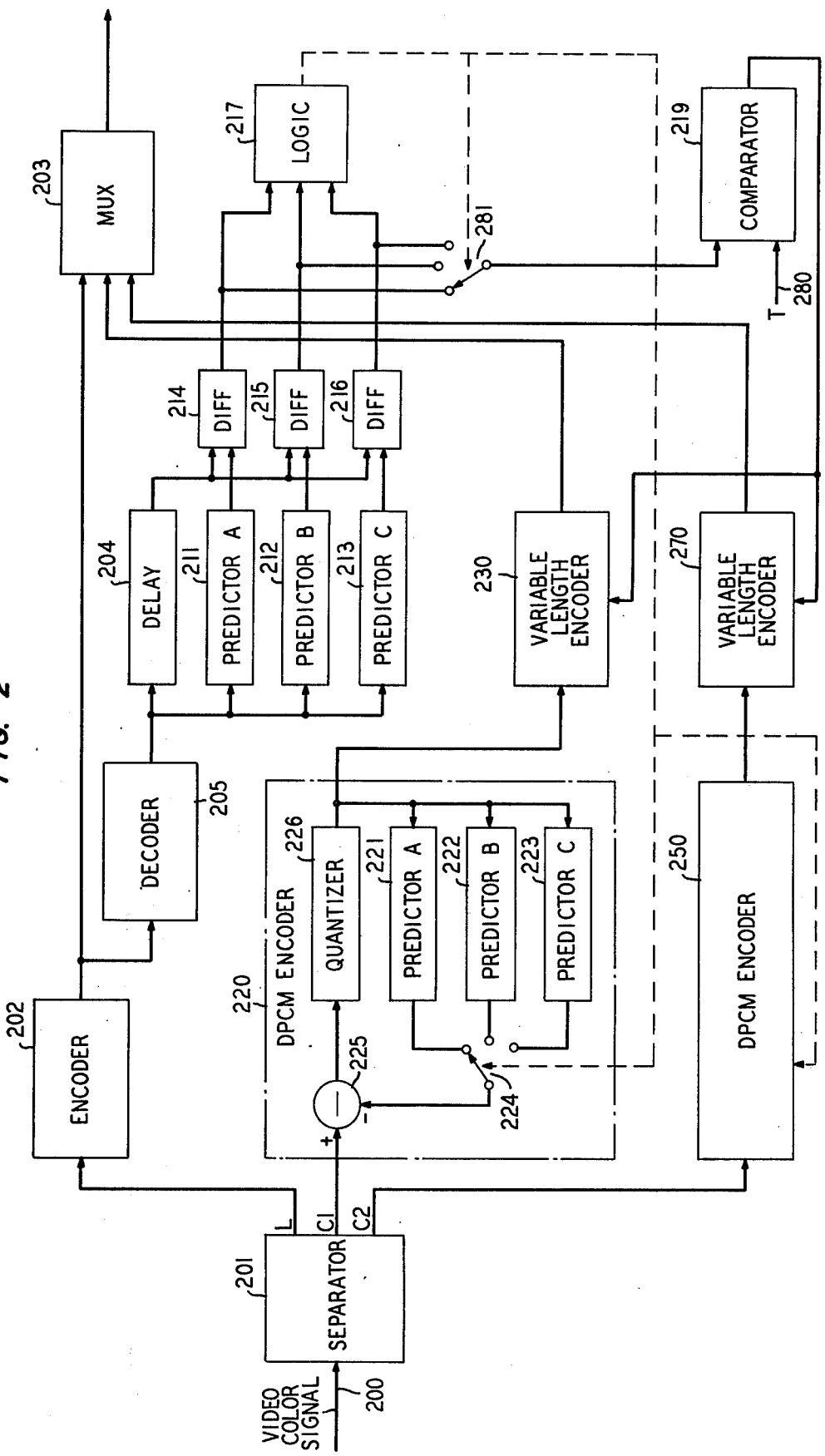
FIG. 2 is a block diagram showing adaptive encoding apparatus constructed in accordance with the principles of the present invention.

Referring now to FIG. 2, a block diagram of an adaptive encoder constructed in accordance with the present invention is shown. A color video signal input to the system on line 200 is conventionally separated into a luminance component L on line 210 and chrominance components $C_1$ and $C_2$ on lines 240 and 260, respectively, by a matrixing circuit or a signal separator 201. The luminance component is applied to an encoder 202, which may be a conventional DPCM encoder or other state of the art encoding arrangement. The output of encoder 202 provides coded luminance samples which are coupled to one input of a multiplexer 203, which transmits the video signal (luminance and chrominance components) to a remote location.

The output of encoder 202 is concurrently applies to a decoder 205 which produces in the transmitter the same decoded luminance component that will be available in the remote receiver. The output of decoder 205 is input to a series of predictors 211, 212, 213, each of which are arranged to form a weighted sum of luminance values from neighboring pels to predict the present luminance value $\bar{L}_n$. As an example, predictor 211 may simply base its prediction on the luminance value $\bar{L}_{n-1}$ of the previous pel in the same line; predictor 212 may base its prediction on the luminance value $\bar{L}_n$ of the corresponding pel in the previous line and predictor 213 may take a weighted sum $\frac{1}{3}(\bar{L}_{n-1} + \bar{L}_n) + 1/6 (\bar{L}_{N-1} + \bar{L}_{n+1})$ of luminance values of several neighboring pels to calculate the next predicted value. In the first two instances, the predictions may be considered "weighted sums" even though only one neighboring pel value is used, since the "weights" assigned to other pels is thus zero. In order to make these predictions, predictors 211-213 may each include conventional elements or line memories, or the same memory elements may be shared by each predictor.

The accuracy of each predicted luminance value is next determined by comparing the output of each predictor with the true luminance value $L_n$ of the same pel. To allow time for processing of these predictions, the output of decoder 205 is applied to a delay circuit 204, which may provide a one sample delay. The output of delay circuit 204 is coupled to one input of a series of differencers 214, 215, 216, each of which receives a second input from one of the predictors. The results of each comparison or subtraction is determined in a selection logic circuit 217, which provides a control output on line 218 which indicates the best prediction pattern or strategy, i.e., the weighted sum which yielded the smallest difference between the predicted and actual luminance values.

In accordance with the present invention, the best predictor for the luminance signal is assumed to be the best predictor for chrominance, so that the same weighted sum of chrominance values is assumed to produce the smallest prediction error. Chrominance predictions are made by applying the first chrominance component $C_1$ to the input of a DPCM encoder 220, which includes in its feedback loop, predictors 221, 222 and 223 which produce weighted sums identical to those produced by predictors 211, 212 and 213, respectively. The particular predictor to be used is determined by the control signal output from selection logic 217 on line 218, which controls the position of a switch 224. For example, if the weighted sum produced by predictor 211 yielded the best luminance prediction, then the corresponding predictor 221 is connected through switch 224 to one input of a substractor 225, which applies the error between the predicted value and the present sample on line 240 to a quantizer 226. The quantizer output, which generally has a fixed word length, is coupled to a second input of multiplexer 203, and to the inputs of each predictor 221-223 to update the contents thereof for the next prediction. If predictor 212 or 213 had produced a smaller prediction error, the corresponding predictor 222 or 223 would have instead been used, by proper positioning of switch 224.

While not shown in detail, chrominance component $C_2$ on line 260 is treated in a manner similar to that just described; encoder 250 includes a plurality of predictors identical to predictors 221-223, and adaptive control is achieved by coupling the output of logic 217 to another predictor selection switch. The output of encoder 250 is also applied to multiplexer 203 for transmission to a remote receiver.

If desired, variable length coders 230 and 260 may be disposed between the outputs of DPCM encoders 220 and 250, respectively, and multiplexer 203. Encoders 230 and 270 may be simple read-only memories, preprogrammed to associate a particular variable length code word with each possible input value thereto. Generally, shorter output words from the variable length encoder are associated with more frequently occurring input values. Thus, the present invention, which reduces the DPCM outputs of encoders 220 and 250 to small error values which occur more frequently, results in an increase in efficiency of the variable length coding. Still further, the input/output characteristics of variable length coders 230 and 270 may be changed or adapted as a function of the "merit" of the best luminance prediction. For example, the precision of the variable length encoders could be adaptively controlled so that if the best prediction error is below a certain threshold value applied to one input of a comparator 219 on line 280, then a first (fine) characteristic may be used, while if the best prediction exceeds the threshold, a second (coarse) characteristic would be employed. The second input to comparator 219 is supplied from one of differencers 214, 215 or 216, depending upon the position of a switch 281 controlled by the logic output on line 218.

Figure 3:
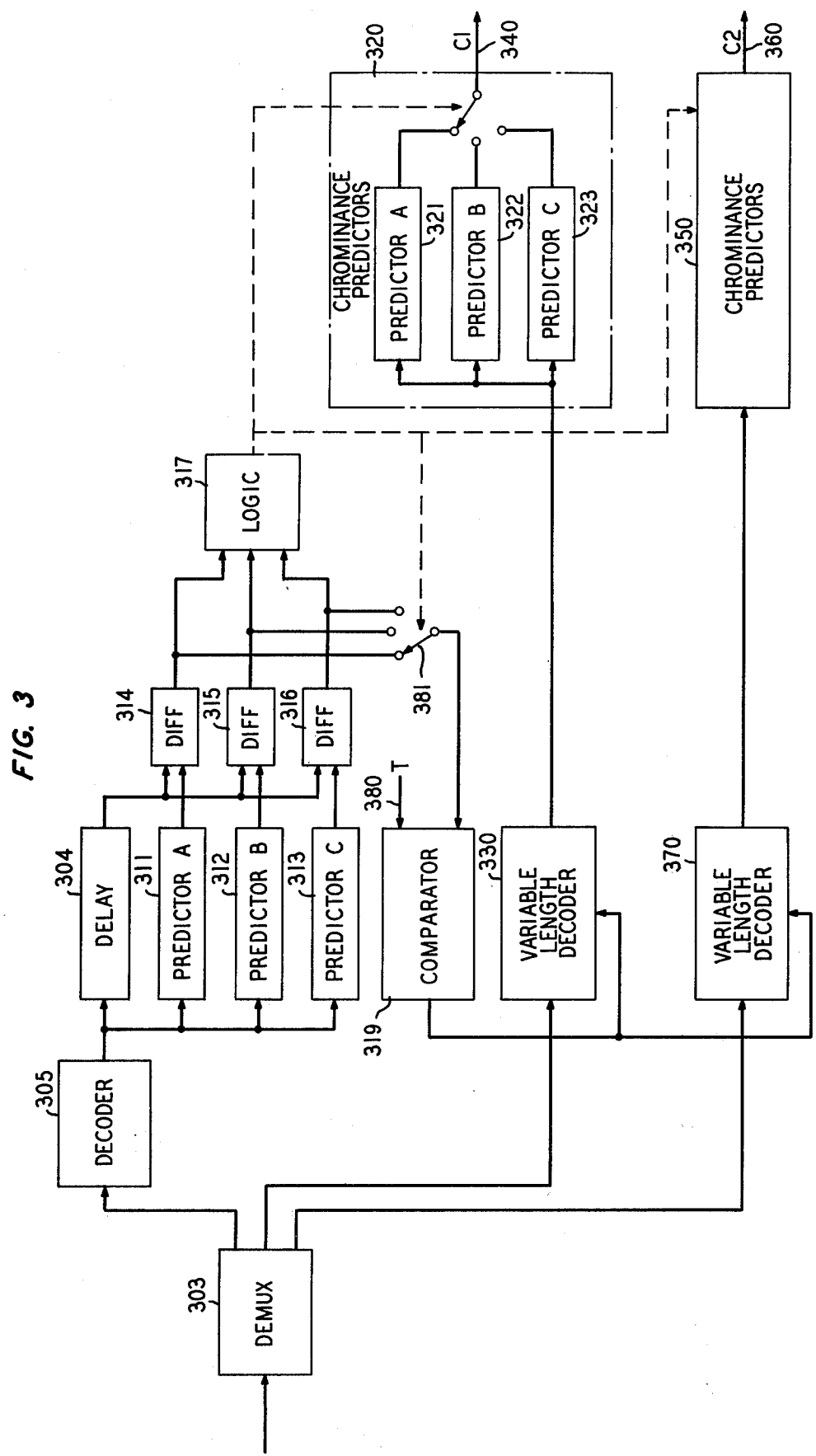
FIG. 3 is a block diagram showing a decoder for use with the encoder of FIG. 2.

A decoder adapted to receive the output of multiplexer 203 at a remote location is shown in block diagram form in FIG. 3. Obviously, the decoder corresponds closely to the FIG. 2 encoder just described.

The received signal is applied to a demultiplexer 303 which provides separate inputs to luminance decoder 305 identical to decoder 205 and to chrominance decoders 320 and 350. The output of decoder 305 is applied to delay circuit 304 and to predictors 311-313, which have the same characteristics as predictors 211-213 so that the outputs of differencers 314-316 represent the prediction errors associated with each prediction. The best prediction is again determined by selection logic 317, the output of which controls the position of switch 324 in chrominance decoder 320 and a similar switch in decoder 350. Switch 324 couples the output of the appropriate predictor 321, 322 or 323 to the chrominance component $C_1$ output line 340; a similar procedure couples $C_2$ to line 360.

If variable length encoders were used in the encoder, similar variable length decoders 330 and 370 would be disposed in the apparatus shown in FIG. 3. The smallest error is coupled to one input of comparator 319 via switch 381, the position of which is controlled by the output of logic 307. The second comparator input is the threshold T on line 380. The input/output characteristics of variable length decoders 330 and 370 are controlled, as before, by the output of comparator 319. The characteristics, of course, are complementary to those of the variable length encoders of FIG. 2.

Figure 4:
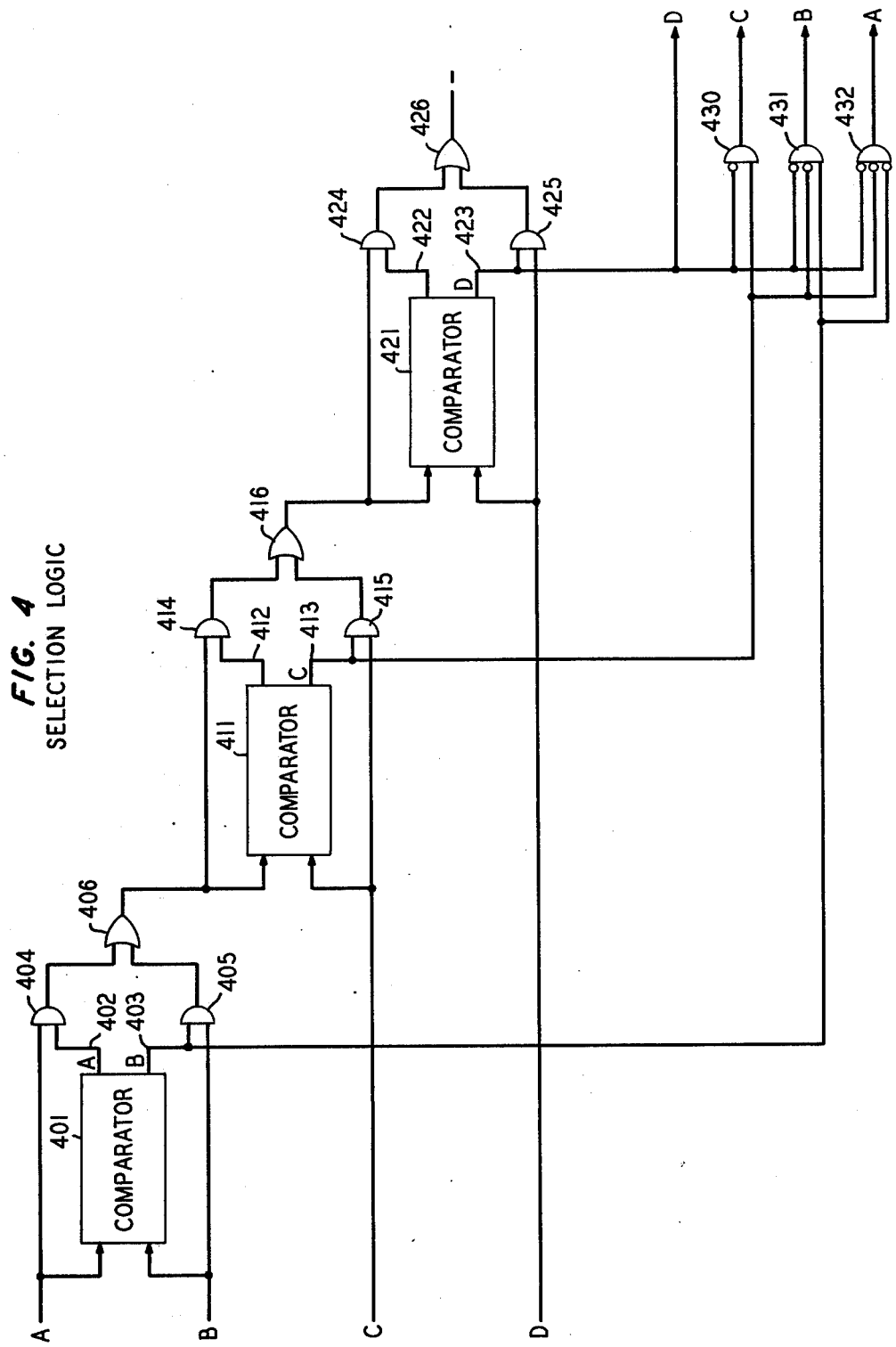
FIG. 4 is a block diagram showing one arrangement for the selection logic circuits 217 and 317 of FIGS. 2 and 3.

Selection logic circuits 217 and 317 may be constructed in many different ways well known to those skilled in the art. For the sake of completeness, one arrangement is shown in block diagram form in FIG. 4. Inputs A, B and C represent the outputs of differencers 214-216 (or 315-316), respectively, and a fourth input D is also shown; further inputs could be added (or removed) depending on the number of predictors being compared.

The A and B inputs are compared in a comparator 401, which provides a high output on line 402 if A < B, and a high output on line 403 if B < A. In the first case, AND gate 404 is enabled to pass the line A value to the next comparator 411 via OR gate 406, while AND gate 405 couples the B value to the next stage if B is the smaller value.

In the next stage, which operates in a similar manner, comparator 411 compares the C input to the input (A or B) from gate 406. If C is smaller, line 413 is high, passing the C value to comparator 421 via OR gate 416. Alternatively, if C is larger line 412 causes AND gate 414 to pass the smaller of A or B to comparator 421. The following stage is similarly constructed and includes AND gates 424 and 425 and OR gate 426.

The smallest of the signals A-D is determined by appropriately combining the outputs from the various comparators. For example, if line 423 is high, D is the smallest input; if line 423 is low and line 413 is high, the output of AND gate 430 goes high, indicating C is the smallest input. In similar fashion, if lines 413 and 423 are low, with line 403 high, B is the smallest input, while with lines 403, 413 and 423 low, A is the desired result. The outputs of FIG. 4 control the position of switches 224, 324 and 281, 381, which each may be implemented as a series of gates in a manner well known to those skilled in the art.

Figure 5A:
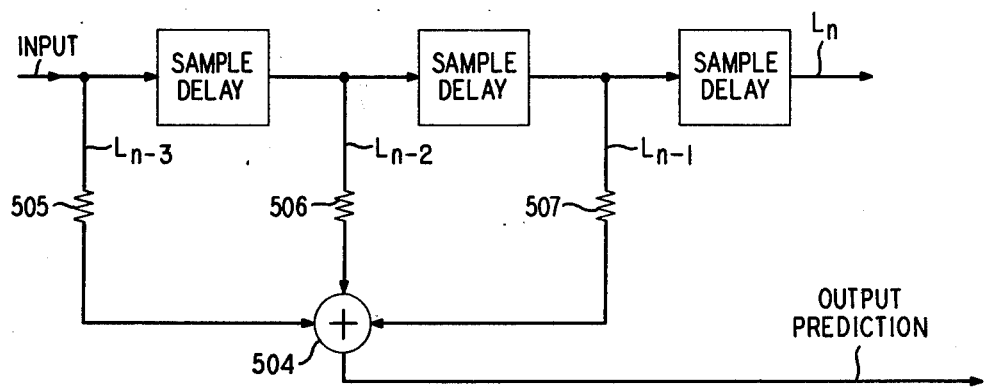
FIGS. 5a and 5b show possible implementations for the predictors of FIGS. 2 and 3.
Figure 5B:
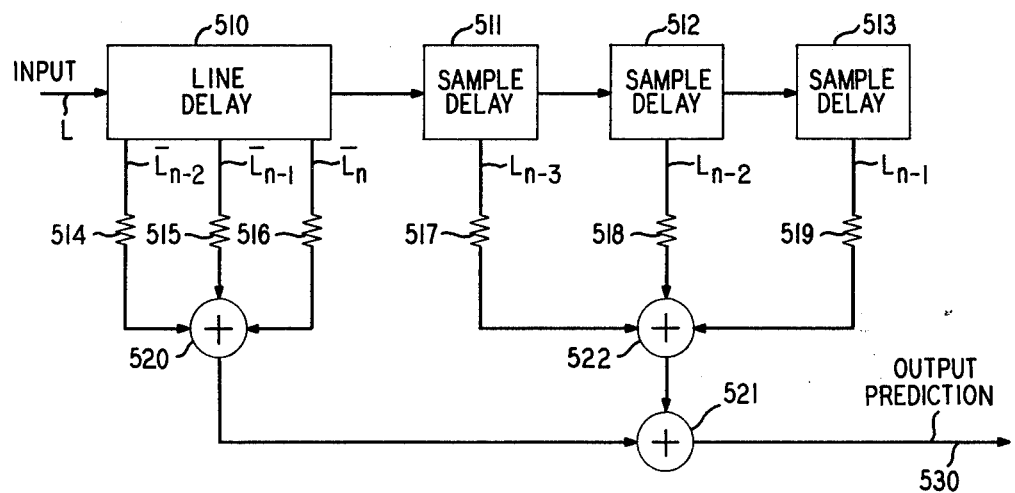

As discussed previously, the luminance and chrominance predictions form the weighted sum of luminance or chrominance values, respectively, of picture elements neighboring the pel being processed; a sum may have the value of only one other element, if the "weights" of yet other elements are considered to be zero. Some possible configurations for predictors are illustrated in FIG. 5a and 5b. In FIG. 5a, a predictor including three one sample delay circuits 501, 502 and 503 connected in series relation is shown. If the luminance component L is input to circuit 501, then when $L_n$ arrives at the last state, previous samples $L_{n-1}$, $L_{n-2}$ and $L_{n-3}$ appear at the other respective delay circuit outputs. These previous samples are combined in an adder 504, via weighting resistors 505-507. If the resistors have equal values, then the prediction formed would be $\frac{1}{3}(L_{n-1} + L_{n-2} + L_{n-3})$. Obviously, unequal values would produce different predictions.

In like manner, as shown in FIG. 5b, the predictor may include both a delay circuit 510 having a one line delay and delay circuits 511-513, each having one sample delays. Here, samples from the previous line ($\bar{L}_{n-2}$, $\bar{L}_{n-1}$ and $\bar{L}_n$, for example) could be combined in adders 520, 521, 522 with samples from the current line ($L_{n-1}$, $L_{n-2}$ and $L_{n-3}$) by appropriate weighting resistors 514-519 to form a desired weighted sum on output line 530. Although FIGS. 5a and 5b show analog weighting, it is to be understood that the various predictions may be generated using totally digital apparatus.

Various modifications may be made to the present invention by those skilled in the art. Accordingly, the invention is to be limited in scope only by the following claims.

For example, while the foregoing description contemplates using only the one best predictor for the present luminance sample to select the predictor for the present chrominance sample, the invention could be extended to control chrominance predictor selection as a function of the best luminance predictors for several surrounding pels. A majority logic circuit could be used to decide which of the best predictors for neighboring pels is used most often, with the logic output then controlling chrominance predictor selection.

What is claimed is:

1. Color video signal encoding apparatus for predicting the chrominance value representing the color information for a picture element in said signal, said picture element having a luminance value $L_n$, comprising:
- (a) means for forming a first prediction of said luminance value of said picture element based upon the luminance value of a first previous picture element, and a second prediction of said luminance value based upon the luminance value of a second previous picture element;
- (b) means for computing the differences between each of said first and second predictions and said luminance value $L_n$; and
- (c) means responsive to said computing means for predicting said chrominance value based upon the chrominance value of either said first or said second previous picture element, depending upon which of said luminance predictions produces a smaller difference.

2. The invention defined in claim 1 further including:
- (a) a quantizer for generating a fixed length output word having a value representative of the difference between said predicted chrominance value and the true value thereof, and
- (b) a variable length encoder responsive to said quantizer output for generating an output code having a length which varies as a function of the frequency of occurrence of said quantizer output value.

3. The invention defined in claim 2 further including:
- (a) means for comparing the smaller of said differences between each of said first and second predictions and said luminance value $L_n$ with a threshold value; and
- (b) means for varying the length of said output code as a function of the output of said comparing means.

4. Color video signal encoding apparatus for predicting the chrominance value of a picture element (pel) in the picture represented by said signal, said pel having a true luminance value, comprising:
- (a) means for forming a plurality of predictions of said true luminance value of said pel by combining the luminance values of neighboring pels in a corresponding plurality of different patterns;
- (b) means for comparing each of said predicted luminance values to said true luminance value to select the one of said patterns producing the smallest luminance prediction error; and
- (c) means for combining the chrominance values of said neighboring pels in accordance with said selected pattern.

5. The invention defined in claim 4 further including:
- (a) means for computing the difference between said predicted chrominance value and the true value thereof; and
- (b) means for encoding said difference as a code having a length which varies as a function of the value of said smallest luminance prediction error.

6. In a DPCM encoder for encoding the color component of a video signal which has a corresponding luminance component, apparatus for predicting the color value of a particular picture element based upon the color values of neighboring picture elements, comprising:
- (a) means for forming at least two predictions of the luminance value of said particular picture element by computing at least two different weighted sums of the luminance values of said neighboring picture elements;
- (b) means for selecting from among said two different weighted sums an optimum weighted sum which produces the smallest luminance prediction error; and
- (c) means responsive to said selecting means for computing the optimum weighted sum of color values of neighboring picture elements.

7. Apparatus for encoding a color video signal including a luminance component and at least one color component, comprising:
- (a) first means for storing past samples of said luminance component;
- (b) second means for storing past samples of said color component;
- (c) third means responsive to said first means for forming a plurality of predictions of the present value of said luminance component using various combinations of said past luminance samples;
- (d) fourth means for evaluating each of said predictions to determine a particular one of said combinations which best approximates said present luminance value; and
- (e) fifth means responsive to said second and fourth means for forming a prediction of the present value of said color component by combining said past color samples using said particular one of said combinations.

8. The invention defined in claim 7 further including a DPCM encoder arranged to generate an output representing the difference between said present and predicted color values; and
a variable length coder for generating a code word of variable length jointly in response to (1) said output of said DPCM encoder and (2) the difference between said present luminance value and said particular combination.

9. Apparatus for encoding a color video signal including a luminance component and at least one chrominance component, comprising:
- (a) means for sampling said luminance and chrominance components at a plurality of picture elements;
- (b) means for forming at least two predictions of the luminance value of one of said picture elements based upon the luminance values of at least first and second different ones of said picture element;
- (c) means for evaluating said first and second predictions to determine which of said different picture elements provide the best luminance prediction; and
- (d) means for forming a prediction of the chrominance value of said one picture element based upon the color value of said different picture elements which provide said best luminance prediction.

10. The invention defined in claim 9 wherein said prediction forming means includes a delay circuit.

11. The invention defined in claim 10 wherein said sampling means is arranged to sample said signal along a plurality of parallel scan lines, and
said delay circuit includes a first output having a one-sample delay and a second output having a one-line delay.

12. A method of encoding the color component of a video signal which has a corresponding luminance component, including the steps of:
- (a) combining past samples of said luminance component in at least two different patterns to generate at least two predictions of the present value of said luminance component;

(b) subtracting each of said predictions from said present value to determine a particular one of said combination patterns which produces the smallest prediction error; and (c) combining past samples of said color component in said particular pattern to generate a prediction of the present value of said color component.

13. The method of claim 12 further including the steps of:

(d) quantizing the difference between said present color value and said prediction thereof; and (e) encoding said quantized difference as a code word having a length which varies as a function of the magnitude of said difference and said smallest prediction error.

* * * * *